(12) United States Patent
Kukuchek et al.

(10) Patent No.: US 12,427,748 B2
(45) Date of Patent: Sep. 30, 2025

(54) COMPOSITES AND METHODS OF FORMING COMPOSITES HAVING TAILORED HARDNESS PROFILE

(71) Applicant: ROHR, INC, Chula Vista, CA (US)

(72) Inventors: Paul E. Kukuchek, San Diego, CA (US); Vijay V. Pujar, San Diego, CA (US)

(73) Assignee: ROHR, INC, Chula Vista, CA (US)

( * ) Notice: Subject to any disclaimer, the term of this patent is extended or adjusted under 35 U.S.C. 154(b) by 0 days.

(21) Appl. No.: 17/864,288

(22) Filed: Jul. 13, 2022

(65) Prior Publication Data

US 2023/0234331 A1 Jul. 27, 2023

Related U.S. Application Data

(60) Provisional application No. 63/286,474, filed on Dec. 6, 2021.

(51) Int. Cl.
*B32B 7/022* (2019.01)
*B32B 5/02* (2006.01)
(Continued)

(52) U.S. Cl.
CPC .............. *B32B 7/022* (2019.01); *B32B 5/024* (2013.01); *B32B 5/263* (2021.05); *B32B 37/18* (2013.01); *B32B 2250/20* (2013.01); *B32B 2260/023* (2013.01); *B32B 2260/046* (2013.01); *B32B 2262/105* (2013.01); *B32B 2262/106* (2013.01);
(Continued)

(58) Field of Classification Search
CPC . C03B 29/00; C04B 33/34; F27B 9/14; C23C 16/00; B32B 7/022; B32B 5/263; B32B 5/024; B32B 37/18; B32B 2264/1024; B32B 2264/104; B32B 2250/20; B32B 2260/023; B32B 2260/046; B32B 2262/106; B32B 2305/188;
(Continued)

(56) References Cited

U.S. PATENT DOCUMENTS 4,892,790 A  1/1990 Gray
4,894,286 A  1/1990 Gray
(Continued)

FOREIGN PATENT DOCUMENTS

CN  113666764  11/2021
EP  955281  11/2003

OTHER PUBLICATIONS

RTP, Minimizing Wear in POrocessing Equipment, accessed online Aug. 30, 2023.*
(Continued)

*Primary Examiner* — Camie S Thompson
(74) *Attorney, Agent, or Firm* — SNELL & WILMER L.L.P.

(57) ABSTRACT

An aerospace component may comprise a fiber reinforced composite material. The fiber reinforced composite material includes a plurality of fiber layers and a carbon matrix surrounding the plurality of fiber layers. A plurality of ceramic particles is dispersed in the carbon matrix. A first fiber layer of the plurality of fiber layers may include a carbon fiber, and a second fiber layer of the plurality of fiber layers may include a non-carbon fiber. A hardness of the non-carbon fiber is greater than a hardness of carbon fiber.

7 Claims, 3 Drawing Sheets

(51) Int. Cl.
  *B32B 5/26* (2006.01)
  *B32B 37/18* (2006.01)
(52) U.S. Cl.
  CPC . *B32B 2264/1024* (2020.08); *B32B 2264/104* (2013.01); *B32B 2305/076* (2013.01); *B32B 2305/188* (2013.01); *B32B 2307/536* (2013.01); *B32B 2313/04* (2013.01); *B32B 2605/18* (2013.01)
(58) Field of Classification Search
  CPC .......... B32B 2305/076; B32B 2313/04; B32B 2307/536; B32B 2605/18
  USPC ...... 156/89, 62.8, 245; 264/58, 60, 113.258; 427/248.1, 249; 428/367; 425/248.1, 425/249
  See application file for complete search history.

(56) References Cited

U.S. PATENT DOCUMENTS

| | | | |
|---|---|---|---|
| 5,071,700 A | * | 12/1991 | Sugino .................... C04B 35/83 423/447.2 |
| 5,298,311 A | | 3/1994 | Bentson et al. |
| 5,354,398 A | * | 10/1994 | Kawai ....................... B32B 5/14 264/258 |
| 10,323,339 B2 | | 6/2019 | Bruno |
| 2007/0199626 A1 | | 8/2007 | Diss et al. |
| 2016/0136923 A1 | | 5/2016 | Zhao et al. |
| 2021/0339499 A1 | | 11/2021 | Mencattelli et al. |

OTHER PUBLICATIONS

Reade, Mohs' Hardness of (Typical) Abrasives, accessed online Aug. 30, 2023.*
Mentz et al., Carbon-fibre-reinforced carbon composite filled with SiC particles forming a porous matrix, Materials Science and Engineering: A, vol. 425, Issues 1-2, Jun. 2006, pp. 64-69.*
European Patent Office, European Partial Search Report dated May 2, 2023 in Application No. 22209482.3.
European Patent Office, European Search Report dated Aug. 2, 2023 in Application No. 22209482.3.
European Patent Office, European Office Action dated Jan. 15, 2025 in Application No. 22209482.3.

* cited by examiner

COMPOSITES AND METHODS OF FORMING COMPOSITES HAVING TAILORED HARDNESS PROFILE

CROSS-REFERENCE TO RELATED APPLICATIONS

This application claims priority to, and the benefit of, U.S. Provisional Application No. 63/286,474, filed Dec. 6, 2021 and titled "COMPOSITES AND METHODS OF FORMING COMPOSITES HAVING TAILORED HARDNESS PROFILE," which is incorporated by reference herein in its entirety for all purposes.

FIELD

The present disclosure relates to composites, and more specifically, to composite parts having tailored hardness profiles.

BACKGROUND

Carbon/carbon ("C/C") composites consist of carbon fibers in a carbon matrix. C/C composites are used to form parts in various industries. For example, C/C parts may be employed in aerospace applications that experience significant aerodynamic heating during operation. The carbon fibers and matrices are relatively soft and prone to ablation during high heating environments. The accuracy of aerospace guidance and/or dimensionally stable equipment can be affected if the aerospace structure to which the equipment is attached does not maintain its structure. For example, if the aerospace structure experiences ablation or is damaged by environmental (e.g., rain, ice, etc.) or other hostile conditions, the guidance equipment may be less accurate. Accordingly, maintaining the shape of the aerospace structure can be critical to equipment accuracy.

SUMMARY

An aerospace component is disclosed herein. In accordance with various embodiments, the aerospace component comprises a fiber reinforced composite material including a plurality of fiber layers and a carbon matrix surrounding the plurality of fiber layers. A plurality of ceramic particles is dispersed in the carbon matrix. A first fiber layer of the plurality of fiber layers includes a first carbon fiber, and a second fiber layer of the plurality of fiber layers includes a non-carbon fiber. A hardness of the non-carbon fiber is greater than a hardness of carbon fiber.

In various embodiments, the plurality of ceramic particles includes at least one of silicon carbide particles, silicon nitride particles, or zirconium oxide particles. In various embodiments, the non-carbon fiber includes at least one of a silicon carbide fiber, a silicon nitride fiber, or a zirconium oxide fiber.

In various embodiments, the plurality of fiber layers includes a plurality of carbon fiber layers interleaved with a plurality of non-carbon fiber layers. The plurality of carbon fiber layers includes the first fiber layer, and the plurality of non-carbon fiber layers includes the second fiber layer.

In various embodiments, a first portion of the fiber reinforced composite material comprises a first hardness, and a second portion of the fiber reinforced composite material comprises a second hardness greater than the first hardness.

In various embodiments, at least one of a volume of the plurality of ceramic particles or a density of the plurality of ceramic particles in the second portion of the fiber reinforced composite material is greater than at least one of the volume of the plurality of ceramic particles or the density of the plurality of ceramic particles in the first portion of the fiber reinforced composite material.

In various embodiments, at least one of a ratio of non-carbon fiber tows to carbon fiber tows, a density of non-carbon fiber tows, or a volume of non-carbon fiber tows in the second portion of the fiber reinforced composite material is greater than at least one of the ratio of non-carbon fiber tows to carbon fiber tows, the density of non-carbon fiber tows, or the volume of non-carbon fiber tows in the first portion of the fiber reinforced composite material.

A method of making an aerospace component having a tailored hardness profile is also disclosed herein. In accordance with various embodiments, the method comprises forming a fiber reinforced composite material having the tailored hardness profile by forming a fiber layup comprising a plurality of fibers and densifying the fiber layup to form a matrix including a plurality of ceramic particles surrounding the plurality of fibers.

In various embodiments, the plurality of fibers includes a plurality of carbon fibers and a plurality of non-carbon fibers. In various embodiments, forming the fiber reinforced composite material further comprises depositing a resin including the plurality of ceramic particles over a plurality of woven fiber sheets and stacking the plurality of woven fiber sheets to form the fiber layup.

In various embodiments, the method further comprises forming a first fiber sheet of the plurality of woven fiber sheets by weaving a carbon fiber tow and a non-carbon fiber tow. In various embodiments, the method further comprises forming each fiber sheet of the plurality of woven fiber sheets by weaving a carbon fiber tow and a non-carbon fiber tow In various embodiments, the plurality of ceramic particles includes at least one of silicon carbide particles, silicon nitride particles, or zirconium oxide particles. In various embodiments, the non-carbon fiber tow includes at least one of a silicon carbide fiber, a silicon nitride fiber, or a zirconium oxide fiber.

In various embodiments, forming the fiber reinforced composite material further includes forming a first portion of the fiber reinforced composite material having a first hardness and forming a second portion of the fiber reinforced composite material having a second hardness greater than the first hardness.

In various embodiments, forming the second portion of the fiber reinforced composite material having the second hardness includes dispersing at least one of a harder ceramic particle, a greater volume of ceramic particles, or a greater density of ceramic particles in the second portion of the fiber reinforced composite material as compared to in the first portion of the fiber reinforced composite material.

In various embodiments, forming the second portion of the fiber reinforced composite material having the second hardness further includes locating a first number of non-carbon fiber tows in the first portion of the fiber reinforced composite and locating a second number of non-carbon fiber tows in the second portion of the fiber reinforced composite. The second number of non-carbon fiber tows is greater than the first number of non-carbon fiber tows.

A guidance system controlled aerospace component is also disclosed herein. In accordance with various embodiments, the guidance system controlled aerospace component comprises a fiber reinforced composite material including a plurality of fibers and a carbon matrix surrounding the plurality of fibers. A plurality of ceramic particles is dispersed in the carbon matrix.

In various embodiments, the plurality of fibers includes a plurality of carbon fibers; and a plurality of non-carbon fibers. In various embodiments, the plurality of ceramic particles includes at least one of silicon carbide particles, silicon nitride particles, or zirconium oxide particles.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
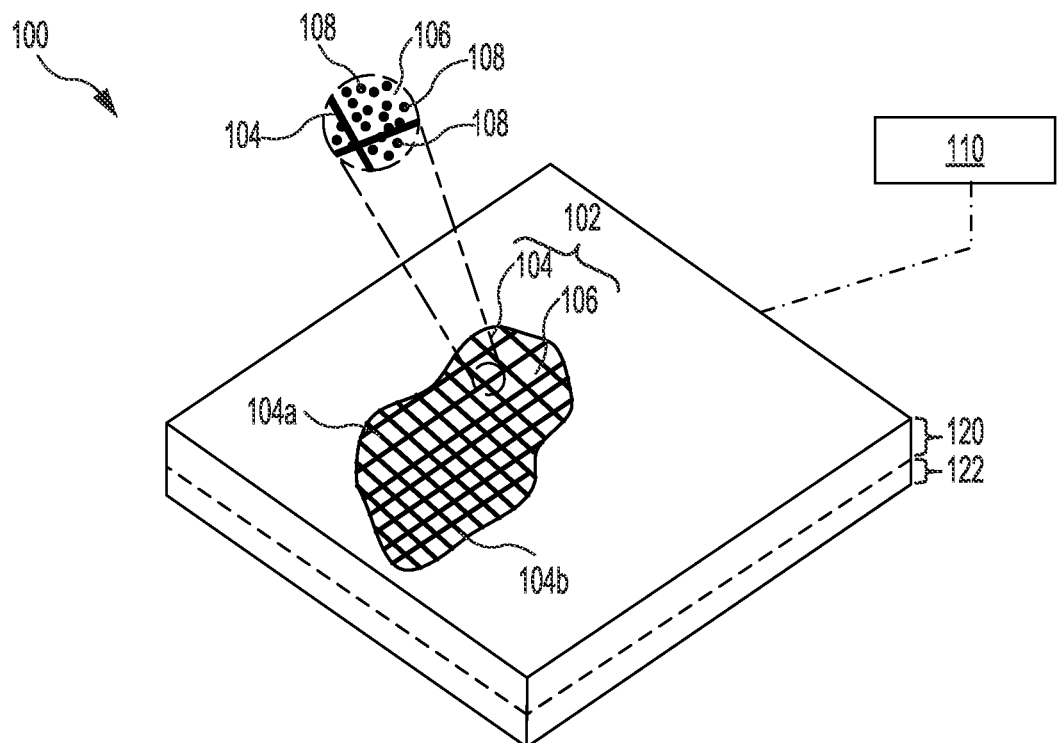
FIG. 1 illustrates an aerospace component including a composite structure formed of ablation resistant fiber reinforced composite material, in accordance with the various embodiments.

With reference to FIG. 1, an aerospace component 100 is illustrated. Aerospace component 100 is formed of a fiber reinforced composite material 102. Fiber reinforced composite material 102 includes a plurality of fibers 104 located in a carbon matrix 106. As described in further detail below, fiber reinforced composite material 102 is tailored to exhibit increased hardness and/or increased abrasion resistance and/or increased ablation resistance, as compared to conventional C/C composites. In various embodiments, ceramic particles 108 may be dispersed throughout the carbon matrix 106 and/or one or more of fibers 104 may be formed of a ceramic material. The ceramic particles 108 and/or ceramic fibers are selected to increase the hardness and/or decrease an abrasion and/or ablation susceptibility of aerospace component 100. In this regard, fiber reinforced composite material 102 may maintain the shape of aerospace component 100. Aerospace component 100 maintaining its shape tends to increase the probability that a guidance system 110 (shown schematically) operably coupled to aerospace component 100 will function accurately. In this regard, aerospace component 100 may be a guidance system controlled aerospace component.

In various embodiments, aerospace component 100 may be a single use component. As such, oxidation may be less of concern when selecting materials and coatings for aerospace component 100. For example, in various embodiments, fiber reinforced composite material 102 may form the exterior surface of aerospace component 100. Stated differently, aerospace component 100 may be devoid of coating layers formed over fiber reinforced composite material 102. Reducing or eliminating coating layers (e.g., SiC or other ceramic coatings) from aerospace component 100 reduces a weight of aerospace component 100.

Fibers 104 include carbon fibers 104a, which may be either preformed carbon or graphite fibers or may be fibers of a material such as a polyacrylonitrile, rayon or pitch, that has been carbonized. In various embodiments, one or more of fibers 104 is a non-carbon fiber 104b, for example, a silicon carbide (SiC) fiber, a silicon nitride (SiC) fiber, or a zirconium oxide (ZrO) fiber. As used herein, "carbon fiber" refers to a fiber that is formed essentially of only carbon (e.g., a fiber that is at least 90% carbon, at least 95% carbon, at least 98% carbon, at least 99% carbon, at least 99.5% carbon, and/or at least 99.8% carbon). As used herein, "non-carbon fiber" refers to a fiber that includes elements other than, or in addition to, carbon. In this regard, "non-carbon" does not mean devoid of carbon. For example, in various embodiments, non-carbon fibers 104b may include silicon carbide (SiC) fibers. In accordance with various embodiments, the non-carbon fibers 104b are harder than the carbon fibers 104a.

Fibers 104 are incorporated and arranged in a manner that adequately reinforces the matrix 106. Fibers 104 may be woven into sheets forming a cloth or may be individual fibers, such as whiskers, arranged in a non-woven fabric or mat. In various embodiments, and with additional reference to FIG. 2, fiber reinforced composite material 102 may be formed by stacking a plurality of woven fiber layers, such as, first fiber layer 114a, second fiber layer 114b, third fiber layer 114c, fourth fiber layer 114d, and fifth fiber layer 114e (collectively fiber layers 114) to form a fiber layup 116. In various embodiments, fiber layers 114 include carbon fibers 104a (also referred to as carbon tows) and non-carbon fibers 104b (also referred to a non-carbon tows).

In various embodiments, at least one of the fiber layers 114 includes both carbon fiber 104a and non-carbon fiber 104b. For example, in various embodiments, at least one of the fiber layers 114 may include a woven fiber layer having a weft formed of carbon fiber 104a and warps formed of non-carbon fiber 104b.

In various embodiments, one or more of fiber layers 114 may include a woven fiber layer, where the weft fibers are non-carbon fibers 104b and the warp fibers are carbon fibers 104a. In various embodiments, one or more of fiber layers 114 may include a woven fiber layer, where the weft fibers include non-carbon fibers 104b and carbon fibers 104a and the warp fibers are carbon fibers 104a. In various embodiments, one or more of fiber layers 114 may include a woven fiber layer, where the warp fibers include non-carbon fibers 104b and carbon fibers 104a and the weft fibers are carbon fibers 104a. In various embodiments, one or more of fiber layers 114 may include a woven fiber layer, where the weft fibers and the warp fibers each include non-carbon fibers 104*b* interleaved with carbon fibers 104*a*. The weaving pattern of the carbon and non-carbon fibers 104*a*, 104*b* of the weft fibers and/or of the warp fibers is/are selected based on the desired hardness for aerospace component 100. In this regard, the weft fibers and/or the warp fibers may include multiple carbon fiber tows 104*a* between adjacent non-carbon fiber tows 104*b* and/or multiple non-carbon fiber tows 104*b* between adjacent carbon fiber tows 104*a*. In various embodiments, each of the fiber layers 114 is weaved with both carbon fibers 104*a* and non-carbon fibers 104*b*.

In various embodiments, at least one of the fiber layers 114 is formed of only carbon fiber tows 104*a* (i.e., is devoid of non-carbon fibers 104*b*) and at least one of the fiber layers 114 is formed of only non-carbon fiber tows 104*b* (i.e., is devoid of carbon fibers 104*a*). For example, fiber layup 116 may include non-carbon fiber layers interleaved with carbon fiber layers. In various embodiments, fibers layers 114 may include at least one fiber layer 114 formed of only carbon fiber tows 104*a* and at least one fiber layer 114 formed of weaved carbon fiber tows 104*a* and non-carbon fiber tows 104*b*.

After stacking the desired number of fiber layers 114, fiber layup 116 is densified. With combined reference to FIG. 1 and FIG. 2, during the densification operation, carbon matrix 106 is deposited around and between the fibers 104. Densification may be done using chemical vapor infiltration (CVI) or any other suitable carbon deposition method.

In accordance with various embodiments, the locations of the carbon fibers 104*a* and non-carbon fibers 104*b*, the material of the non-carbon fibers 104*b*, the weave pattern of carbon fibers 104*a* and non-carbon fibers 104*b* in fiber layers 114, and/or the ratio of carbon fibers 104*a* to non-carbon fibers 104*b* is/are selected to create a desired hardness profile through fiber reinforced composite material 102.

Figure 2:
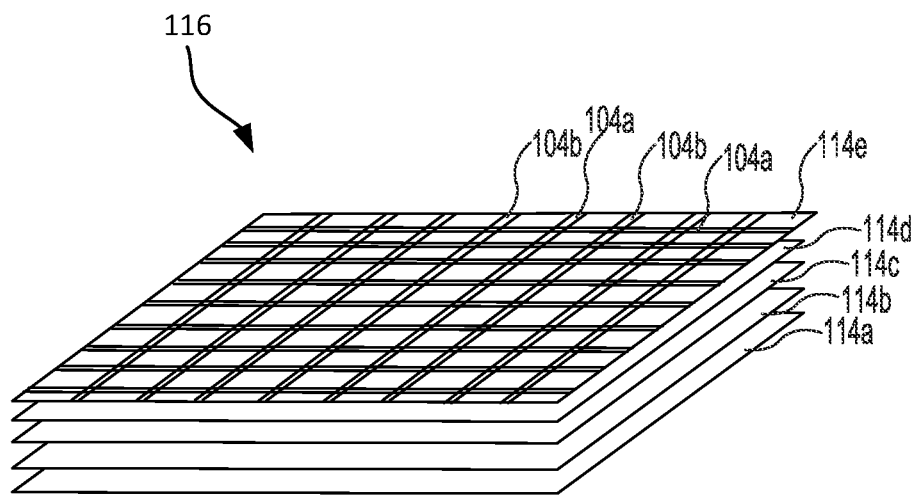
FIG. 2 illustrates a fiber layup for forming the fiber reinforced composite material of the aerospace component in FIG. 1, in accordance with the various embodiments.

In accordance with various embodiments, fiber reinforced composite material 102 may include a plurality of particles 108 distributed throughout matrix 106. The inclusion of hard particles, such as SiC, SiN and/or ZrO, in the matrix 106 increases the hardness of fiber reinforced composite material 102, as compared to convention C/C composite. The particles 108 may be introduced into fiber reinforced composite material 102 by adding a particle powder to resin systems during a prepregging operation. The particles 108 are preferably small (e.g., one to two microns) so that the particles 108 may distribute into the interstices in the fiber layup 116. Primary considerations in the introduction of the ceramic particles 108 include filler content, filled resin rheology, and reactivity of the ceramic powders 108 with the carbon fibers 104 and matrix 106 during high temperature processing. The particles 108 are preferably selected to react with the carbon of matrix 106 and form reaction bonds. As an example, a prepregging resin including, for example, phenolic resin having ceramic particles (e.g., SiC, SiN, and/or ZrO particles) dispersed therein, may be applied to one or more of fiber layers 114 (FIG. 2).

The composition, size, and amount of particles 108 included in matrix 106 is/are selected to create a desired hardness profile through fiber reinforced composite material 102. In various embodiments, a hardness of fiber reinforced composite material 102 may not be uniform across aerospace component 100. For example, a first portion 120 of fiber reinforced composite material 102 includes a first hardness and a second portion 122 of fiber reinforced composite material 102 includes a second hardness, which is greater than the first hardness. Second portion 122 may correspond to areas of aerospace component 100 that are more susceptible to damage and/deformation.

In various embodiments, a ratio of carbon fibers 104*a* to non-carbon fibers 104*b* in first portion 120 is greater in first portion 120 as compared to the ratio of carbon fibers 104*a* to non-carbon fibers 104*b* in second portion 122. In various embodiments, a hardness, number, density, and/or volume of non-carbon fibers 104*b* is greater in second portion 122 as compared to the hardness, number, density, and/or volume, respectively, of non-carbon fibers 104*b* in first portion 120. In various embodiments, a hardness of the particles 108 located in second portion 122 is greater than a hardness of the particular 108 located in first portion 120. In various embodiments, a number, volume, and/or density of the particles 108 located in second portion 122 is greater than a number, volume, and/or density, respectively, of the particles 108 located in first portion 120. In this regard, the locations of carbon fibers 104*a* and non-carbon fibers 104*b*, a weave pattern of carbon fibers 104*a* and non-carbon fibers 104*b*, the ratio of carbon fibers 104*a* to non-carbon fibers 104*b*, the material of non-carbon fibers 104*b*, the material of particles 108 in first portion 120, the material of particles 108 in second portion, and/or the number, density, and/or volume of particles 108 in first portion 120 and second portion 122 are each selected to create a tailored and/or varied hardness through fiber reinforced composite material 102.

Figure 3A:
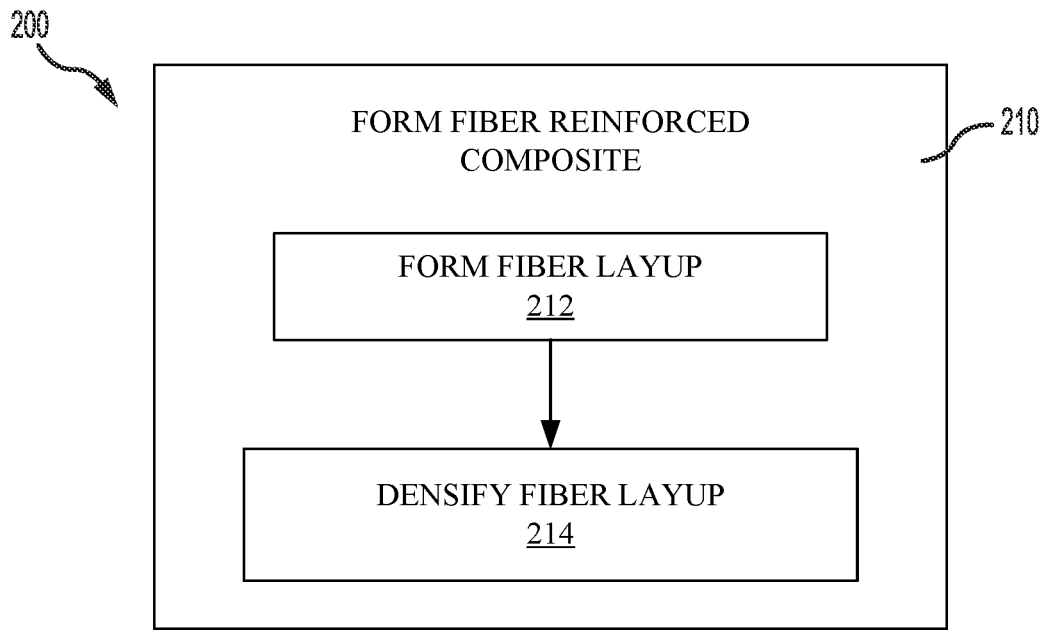
FIGS. 3A, 3B, and 3C illustrate a method of making a composite structure having a tailored hardness profile, in accordance with various embodiments.

With reference to FIG. 3A, a method 200 of making an aerospace component having a tailored hardness profile is illustrated. Method 200 may include forming a fiber reinforced composite having the tailored hardness profile (step 210). In various embodiments, step 210 may include forming a fiber layup comprising a plurality of carbon fibers and a plurality of non-carbon fibers (step 212) and densifying the fiber layup to form a matrix including a plurality of ceramic particles around the plurality of fibers (step 214).

Figure 3B:
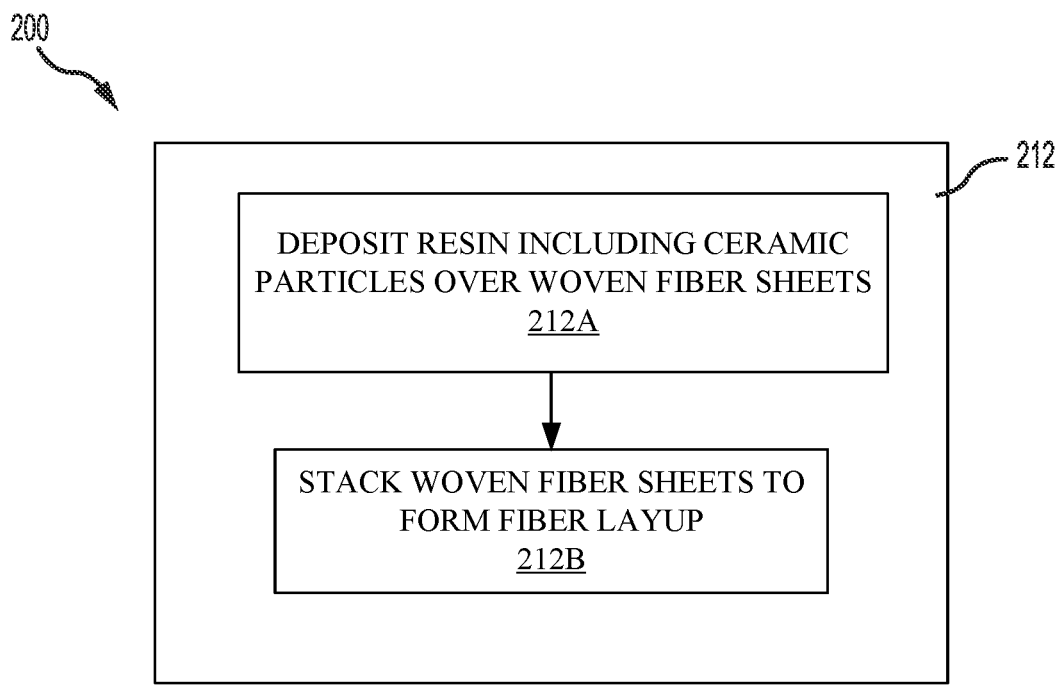

With reference to FIG. 3B, in various embodiments, step 212 may include depositing a resin including the plurality of ceramic particles over a plurality of woven fiber sheets (step 212A) and stacking the plurality of woven fiber sheets to form the fiber layup (step 212B). In various embodiments, step 212A may be formed prior to step 212B (e.g., the resin may be deposited over the woven sheets prior stacking). In various embodiments, step 212A may be formed after step 212B (e.g., the woven sheets may be stacked and then the resin may be deposited over the stacked sheets).

In various embodiments, step 212 may further comprise forming a first fiber sheet of the plurality of woven fiber sheets by weaving together a carbon fiber tow and a non-carbon fiber tow. In various embodiments, step 212 may further comprise forming each fiber sheet of the plurality of woven fiber sheets by weaving together a carbon fiber tow and a non-carbon fiber tow.

Figure 3C:
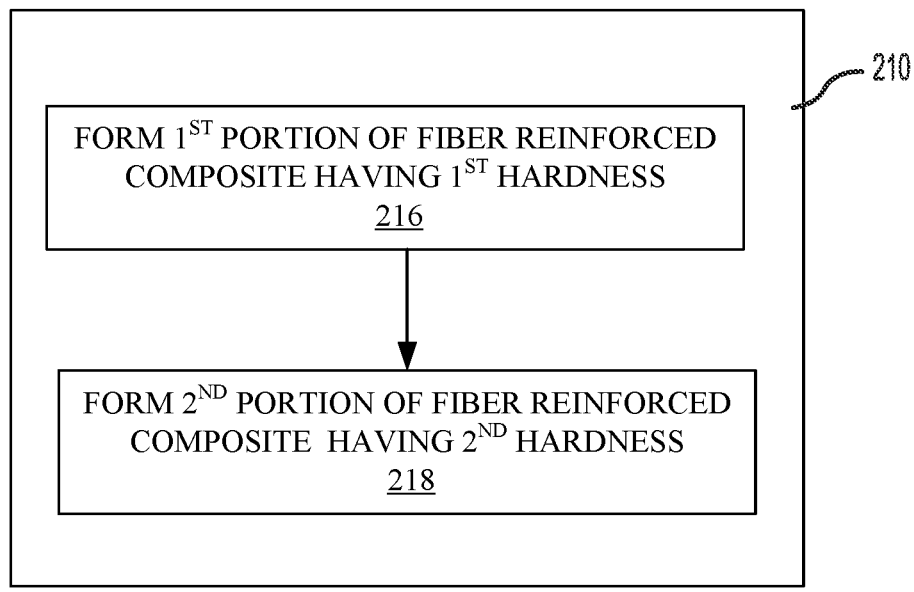

With reference to FIG. 3C, in various embodiments, step 210 may further include forming a first portion of the fiber reinforced composite material having a first hardness (step 216) and forming a second portion of the fiber reinforced composite material having a second hardness greater than the first hardness (step 218).

In various embodiments, step 218 may include dispersing at least one of a harder ceramic particle in the second portion of the fiber reinforced composite material as compared to in the first portion of the fiber reinforced composite material, dispersing aa greater volume of ceramic particles in the second portion of the fiber reinforced composite material as compared to in the first portion of the fiber reinforced composite material, and/or dispersing a greater density of ceramic particles in the second portion of the fiber reinforced composite material as compared to in the first portion of the fiber reinforced composite material.

In various embodiments, step 218 may include locating a first number of non-carbon fiber tows in the first portion and locating a second number of non-carbon fiber tows in the second portion, the second number of non-carbon fiber tows being greater than the first number of fiber tows.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. An aerospace component, comprising:
   a fiber reinforced composite material including:
   a plurality of fiber layers; and
   a carbon matrix surrounding the plurality of fiber layers, wherein a plurality of ceramic particles is dispersed in the carbon matrix;
   wherein a first fiber layer of the plurality of fiber layers includes only carbon fiber tows devoid of non-carbon fibers and
   wherein a second fiber layer of the plurality of fiber layers includes only non-carbon fiber tows, the non-carbon fiber tows including elements other than carbon, a hardness of the non-carbon fiber tows being greater than a hardness of carbon fiber tows.

2. The aerospace component of claim 1, wherein the plurality of ceramic particles includes at least one of silicon carbide particles, silicon nitride particles, or zirconium oxide particles.

3. The aerospace component of claim 2, wherein the non-carbon fibers includes at least one of a silicon carbide fiber, a silicon nitride fiber, or a zirconium oxide fiber.

4. The aerospace component of claim 1, wherein the plurality of fiber layers includes a plurality of carbon fiber layers interleaved with a plurality of non-carbon fiber layers, the plurality of carbon fiber layers including the first fiber layer, and the plurality of non-carbon fiber layers including the second fiber layer.

5. The aerospace component of claim 1, wherein a first portion of the fiber reinforced composite material comprises a first hardness, and wherein a second portion of the fiber reinforced composite material comprises a second hardness greater than the first hardness.

6. The aerospace component of claim 5, wherein at least one of a volume of the plurality of ceramic particles or a density of the plurality of ceramic particles in the second portion of the fiber reinforced composite material is greater than at least one of the volume of the plurality of ceramic particles or the density of the plurality of ceramic particles in the first portion of the fiber reinforced composite material.

7. The aerospace component of claim 5, wherein at least one of a ratio of non-carbon fiber tows to carbon fiber tows, a density of non-carbon fiber tows, or a volume of non-carbon fiber tows in the second portion of the fiber reinforced composite material is greater than at least one of the ratio of the non-carbon fiber tows to the carbon fiber tows, the density of the non-carbon fiber tows, or the volume of the non-carbon fiber tows in the first portion of the fiber reinforced composite material.

* * * * *